(12) United States Patent
Lee

(10) Patent No.: US 7,762,090 B2
(45) Date of Patent: Jul. 27, 2010

(54) PLATE HEAT EXCHANGER WITH CONDENSED FLUID SEPARATING FUNCTIONS

(76) Inventor: Byeong-Seung Lee, 101-1503, #1515-2 Jungdong, Haeundae-gu, Pusan (KR)

( * ) Notice: Subject to any disclaimer, the term of this patent is extended or adjusted under 35 U.S.C. 154(b) by 474 days.

(21) Appl. No.: 10/984,668

(22) Filed: Nov. 9, 2004

(65) Prior Publication Data

US 2006/0010887 A1 Jan. 19, 2006

(30) Foreign Application Priority Data

Jul. 13, 2004 (KR) ...................... 10-2004-0054274

(51) Int. Cl.
*F28B 9/08* (2006.01)

(52) U.S. Cl. .................... 62/93; 62/89; 62/90; 165/166; 165/113

(58) Field of Classification Search .................... 62/272, 62/173, 93, 909, 89, 90; 165/65, 66, 166, 165/167, 113
See application file for complete search history.

(56) References Cited

U.S. PATENT DOCUMENTS

| 3,334,399 | A | * | 8/1967 | Teeguarden | ............ | 29/890.039 |
|---|---|---|---|---|---|---|
| 3,963,466 | A | * | 6/1976 | Hynes | ........................ | 55/434.4 |
| 4,027,729 | A | * | 6/1977 | Bruhl | .......................... | 165/111 |
| 4,186,495 | A | * | 2/1980 | Remberg et al. | ............... | 34/92 |
| 4,915,165 | A | * | 4/1990 | Dahlgren et al. | ............ | 165/166 |
| 5,727,623 | A | * | 3/1998 | Yoshioka et al. | ............ | 165/113 |
| 5,893,408 | A | * | 4/1999 | Stark | ........................... | 165/66 |
| 6,085,529 | A | * | 7/2000 | Galus et al. | .................... | 62/93 |
| 7,121,102 | B2 | * | 10/2006 | Fijas et al. | ..................... | 62/93 |

* cited by examiner

*Primary Examiner*—Cheryl J Tyler
*Assistant Examiner*—John F Pettitt
(74) *Attorney, Agent, or Firm*—Jordan and Hamburg LLP

(57) ABSTRACT

A plate heat exchanger with a condensed fluid separating function, which includes a reheater having plural laminated wrinkled plates and introduction and discharge holes connected to different compressed air channels therein; a chiller having plural laminated wrinkled plates, working fluid inlet and outlet holes connected to a working fluid channel therein, and compressed air channels formed therein; and a wall-shaped pipe configured for partitioning the reheater and the chiller with providing a flow line to communicate a compressed air with he reheater and the chiller. An adiabatic expansion chamber is formed in a lower portion of the chiller on a flow line for the compressed air cooled in the chiller to move toward the reheater. A condensation chamber is formed in a lower portion of the reheater connected to the adiabatic expansion chamber. A condensation mesh sieve and a drainage hole are formed in the condensation hole.

13 Claims, 3 Drawing Sheets

PLATE HEAT EXCHANGER WITH CONDENSED FLUID SEPARATING FUNCTIONS

BACKGROUND OF THE INVENTION

1. Field of the Invention

The present invention relates to a plate heat exchanger with a condensed fluid separating function and its manufacturing method, and more particularly to an integrated plate heat exchanger with a condensed fluid separating function in which a separator connected to outside of the plate heat exchanger by means of a pipe is integrally mounted in the plate heat exchanger so that a conventional heat transfer loss caused by fluid channel for connecting the separator to a reheater and a chiller is prevented, a discharging efficiency of a condensed fluid is maximized, and a cooling air drier may become smaller and lighter, and its manufacturing method.

2. Description of the Prior Art

A plate heat exchanger is used for changing a hot compressed air into a cold compressed air, and generally used as a component of an air drier. Such an air drier changes a hot and humid saturated air into a cold and dry compressed air, which may be used in various industrial equipments. The air drier is generally composed of a plate heat exchanger and a separator.

In the plate heat exchanger, a plurality of plates that are shaped irregularly in consideration of kind of the fluid, channel of the fluid and strength of the plate are laminated so that a hot and humid compressed air that is called a hot side and a working fluid that is called a cold side are alternately flowed between the plates for the purpose of heat exchange. That is to say, the interlayer channel between the plates is isolated from the atmosphere and adjacent channels, and two different kinds of working fluids are isolated by the plate so as to ensure counter flow, so hot and cold working fluids are placed in turns to cause heat exchange.

The plate heat exchanger is partitioned into a reheater part and a chiller part by means of a membrane, and a separator connected to the chiller and the reheater is installed out of the plate heat exchanger. Here, the separator separates the fluid condensed in the chiller by means of heat exchange from the cold and dry compressed air, and then supplies only the cold and dry compressed air to the reheater.

Thus, the hot and humid saturated air compressed by a compressor is introduced into an introduction hole of the plate heat exchanger so as to be cooled in the reheater by means of primary heat exchange with the cold and dry compressed air, then supplied to the chiller for secondary heat exchange with a working fluid, and then introduced into the separator so as to be separated into fluid and a cold and dry compressed air. The cold and dry compressed air is then supplied to the reheater again for third heat exchange with the hot and humid compressed air, and then discharged.

The conventional plate heat exchanger is structurally not capable of separating the condensed fluid by itself, so a separator is additionally installed outside of it and the separator is connected to the chiller and the reheater by means of external pipes. Thus, the conventional air drier needs an additional area for installation of the separator, so it is hardly possible to reduce its size and weight.

In addition, the fluid channel for connecting the reheater and the chiller to the separator causes a heat transfer loss.

SUMMARY OF THE INVENTION

The present invention is designed to solve the problems of the prior art, and therefore it is an object of the present invention to minimize installation space, avoid the heat transfer loss in the prior art connection pipes between a condensed fluid separator and a plate heat exchanger, and also remarkably reduce manufacturing costs.

In order to accomplish the above objects, the present invention provides a plate heat exchanger and a method for manufacturing the flat plate heat exchanger wherein the plate heat exchanger has an internal condensed fluid separating function with an adiabatic expansion chamber formed in a chiller for separating moisture from hot and humid air to make cool and dry compressed air and a condensation chamber in a reheater with a mesh sieve installed in order to extract moisture remaining in the cool and dry compressed air.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Figure 1:
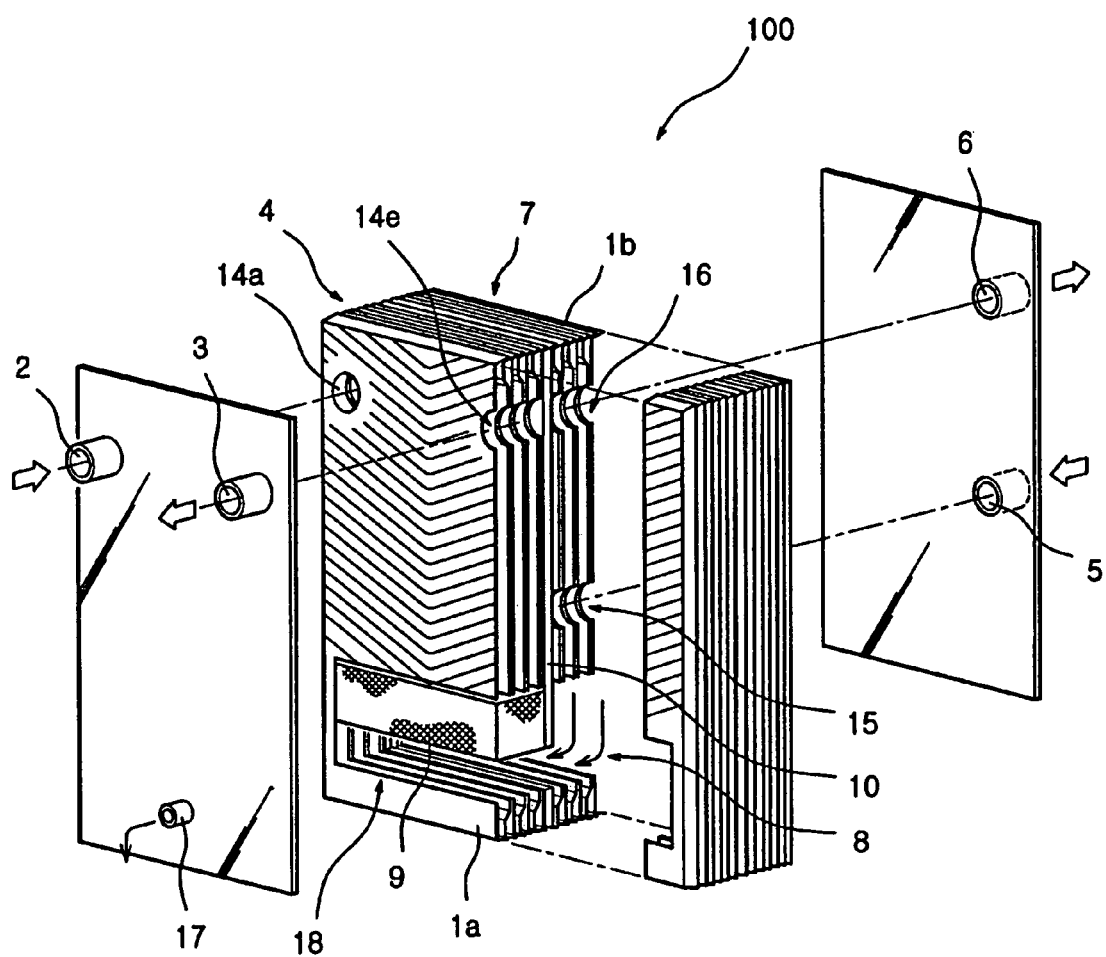
FIG. 1 is an exploded perspective view showing a plate heat exchanger according to the present invention.

Hereinafter, the present invention will be described in more detail referring to the drawings.

Figure 2:
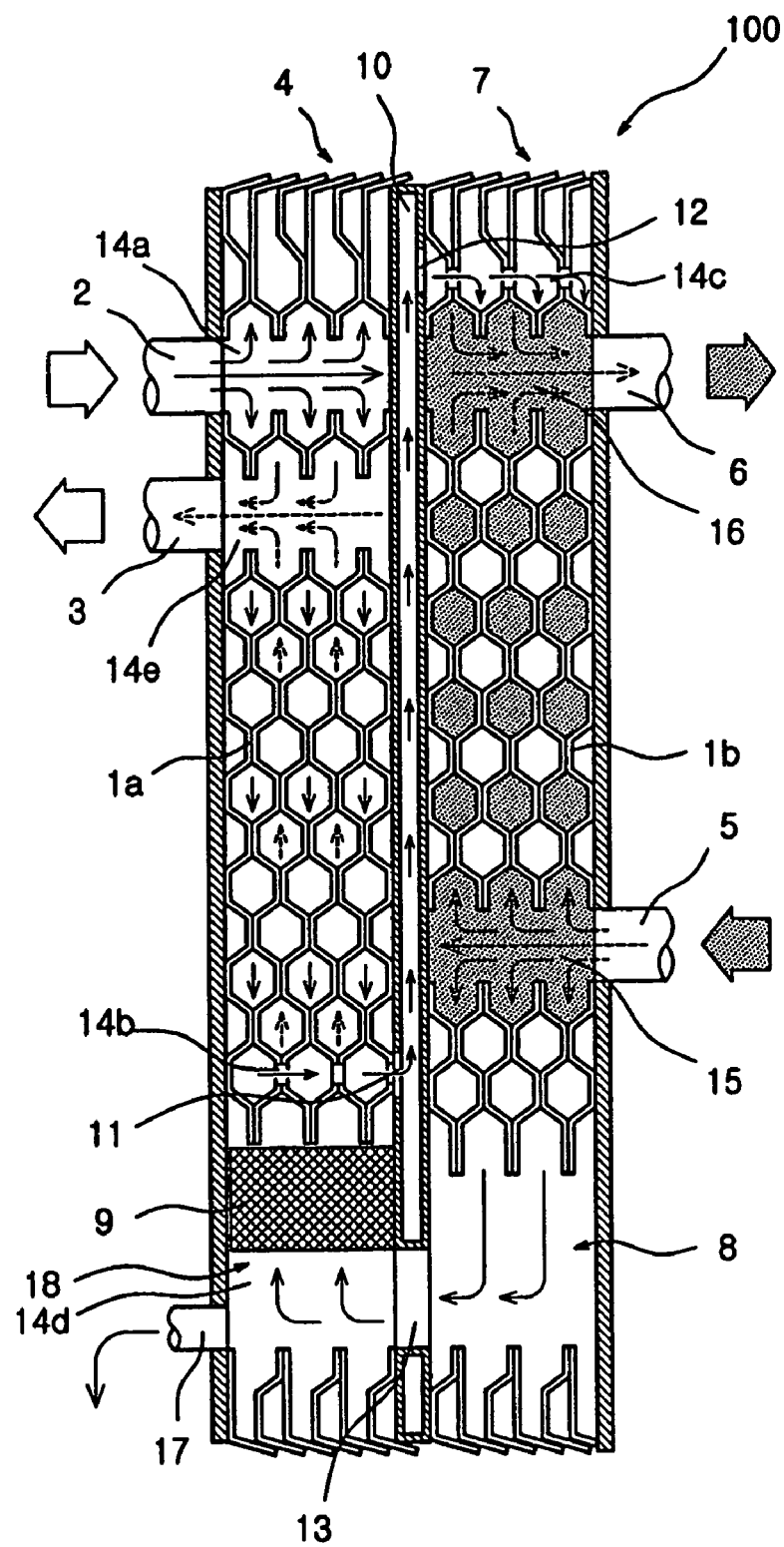
FIG. 2 is a sectional view showing the plate heat exchanger according to the present invention.
Figure 3:
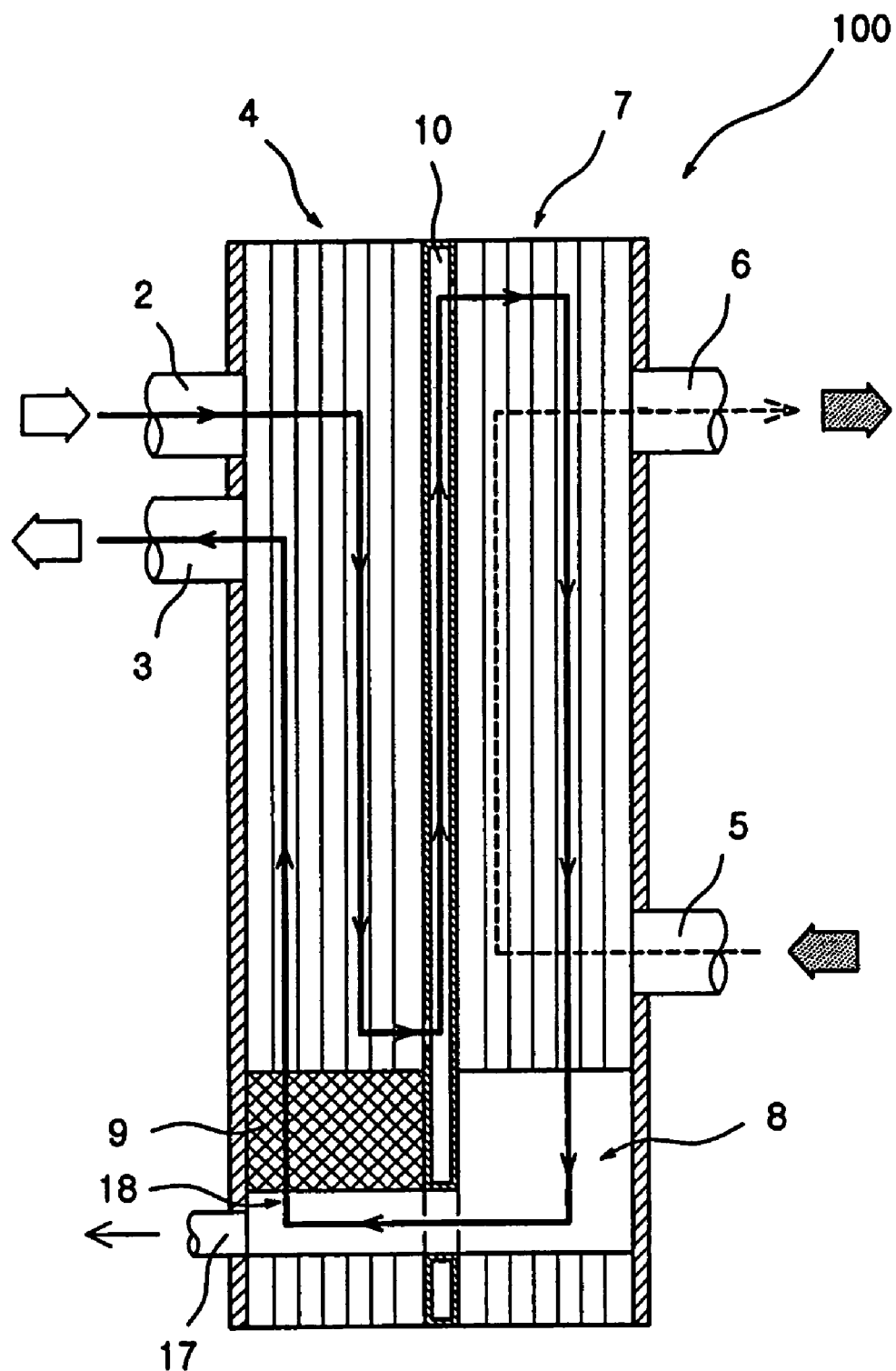
FIG. 3 shows fluid flow in the plate heat exchanger according to the present invention.

FIG. 1 is an exploded perspective view showing a plate heat exchanger according to the present invention, FIG. 2 is a sectional view of the plate heat exchanger, and FIG. 3 shows flow of compressed air and working fluid in the plate heat exchanger.

As shown in FIGS. 1 and 2, an integrated plate heat exchanger 100 with a condensed fluid separating function according to the present invention includes a reheater 4 having a plurality of wrinkled plates 1a laminated therein, wherein two internal air channels are formed by means of the laminated plates 1a so as to be connected to an introduction hole 2 and a discharge hole 3; and a chiller 7 having a plurality of wrinkled plates 1b laminated to form two internal channels therein, wherein a working fluid inlet hole 5 and a working fluid outlet hole 6 connected to a working fluid channel among the channels are formed therein, and wherein air is flowed in the other channel. In the plate heat exchanger 100, an adiabatic expansion chamber 8 in which a plurality of air channels formed in the chiller 7 are united is formed in a lower portion of the chiller 7 on a flow line for the compressed air cooled in the chiller 7 to move toward the reheater 4. In addition, a condensation chamber 18 having a condensation mesh sieve 9 is formed in a lower portion of the reheater 4 connected to the adiabatic expansion chamber 8.

Here, at each of the plates 1a that are laminated in multi layers to configure the reheater 4, holes for forming the condensation chamber 18 and flow lines 14a, 14b and 14e are respectively perforated. In addition, at each of the plates 1b that configure the chiller 7, a hole for forming the adiabatic expansion chamber 8, a hole for forming a flow line 14c, and holes for forming a working fluid inlet channel 15 and a working fluid outlet channel 16 are also perforated.

A wall-shaped pipe 10 is formed between the reheater 4 and the chiller 7 so as to partition them. The wall-shaped pipe 10 has a reheater-faced hole 11 into which the compressed air passing through the reheater 4 is introduced, a chiller-faced hole 12 through which the compressed air is supplied to the chiller 7, and a communication hole 13 that communicates the chiller 7 with the reheater 4 in a lower portion of the wall-shaped pipe 10.

The introduction hole 2 for introducing a hot and humid compressed air is formed in an upper portion of the reheater 4. The flow line 14a communicated with the introduction hole 2 is formed through the laminated plates 1a to communicate with an interlayer channel between plates. The flow line 14b for connecting the flow line 14a and the compressed air channel communicated to the flow line 14a is formed in a lower portion of the reheater 4 in connection to a reheater-faced hole 11 of the wall-shaped pipe 10. The flow line 14d for connecting compressed air channels circulated through the chiller 7 into one line is formed so as to communicate with the communication hole 13 of the wall-shaped pipe 10 so that the condensation chamber 18 having the condensation mesh sieve 9 is formed in the flow line 14d. Thus, the internal channels communicated with the discharge hole 3 of the reheater 4 are united. A drainage hole 17 is formed in one side of the condensation chamber 18.

In addition, the flow line 14c is formed in an upper portion of the chiller 7 so as to be connected to the chiller-faced hole 12 of the wall-shaped pipe 10 and communicated with an interlayer channel of the chiller 7. The adiabatic expansion chamber 8 is formed in a lower portion of the chiller 7 so as to communicate with the flow line 14c and an internal channel and also communicated with the communication hole 13 of the wall-shaped pipe 10 and the flow line 14d of the reheater 4. The working fluid inlet hole 5 for a working fluid to be introduced and a working fluid inlet channel 15 communicated with the working fluid inlet hole 5 are formed. In addition, the working fluid inlet channel 15 is connected to a working fluid outlet channel 16 communicated with the working fluid outlet hole 6 in communication with an internal channel (see FIGS. 1 and 2).

FIG. 3 shows flow of compressed air and working fluid in the plate heat exchanger according to the present invention. In FIG. 3, a working fluid is indicated by a dotted line, and a hot and humid air indicated by a solid line passing through the reheater 4 is changed into a cold and dry air through the chiller 7 and then circulated to the reheater again 4.

In the integrated plate heat exchanger 100 configured as mentioned above, a hot and humid compressed air is introduced into the reheater 4 through the introduction hole 2 via the flow line 14a connected to the introduction hole 2, and then flows through a plurality of channels formed in the reheater 4.

The channels in the reheater 4 are formed by laminating a plurality of wrinkled plates 1a, and classified into two parts: one is a channel through which a hot and humid compressed air introduced through the introduction hole 2 is flowed, and the other is a channel through which a cold and dry compressed air passing through the chiller 7 is flowed and which is connected to the discharge hole 3. Thus, the reheater 4 forms two kinds of channels by means of the laminated plates 1a, and the channels are isolated from each other so that fluid in each channel is not mixed with other fluid in another channel, but conducting heat exchange.

Thus, the hot and humid compressed air introduced through the introduction hole 2 and the flow line 14a is collected in the flow line 14b through the internal channel, then passes into the wall-shaped pipe 10 through the reheater-faced hole 11 of the wall-shaped pipe 10, and is then introduced into the flow line 14c of the chiller 7 through the chiller-faced hole 12. During this procedure, a primary heat exchange is conducted.

The hot and humid compressed air in the flow line 14c formed in an upper portion of the chiller 7 then passes by the adiabatic expansion chamber 8 through the channel formed in the chiller 7. During this procedure, secondary heat exchange is conducted with a working fluid passing through other channels in the chiller 7. The working fluid is flowed in through the working fluid inlet hole 5 in a lower portion of the chiller 7, and then flowed out through the working fluid outlet channel 16 and the working fluid outlet hole 6 via the working fluid inlet channel 15 and a plurality of internal channels of the chiller 7 connected to the working fluid inlet channel 15.

Of course, the compressed air and the fluid passing through the chiller 7 10 are not mixed but conduct just regular secondary heat exchange since they are partitioned by the laminated plates 1b and alternately flowed.

As mentioned above, with passing through the chiller 7, hot and humid compressed air is separated from moisture and changed into a cold and dry compressed air. At this time, the separated moisture is dropped down and then drained through the drainage hole 17 formed in a lower portion of the condensation chamber 18.

In the present invention, separation of moisture is caused by the secondary heat exchange as well as the adiabatic expansion. For this purpose, the adiabatic expansion chamber 8 is widely formed in a lower portion of the chiller 7 in the present invention. That is to say, the adiabatic expansion chamber 8 is formed at a lower end of the plurality of plates 1b that compose the chiller 7, and the channels for compressed air formed in the chiller 7 are united in the adiabatic expansion chamber 8.

Thus, when the compressed air is flowed from the narrow channels into the wide adiabatic expansion chamber 8, adiabatic expansion is caused due to the drop of pressure, and temperature is lowered due to the consumption of internal energy. Therefore, moisture remaining in the air is condensed and separated.

After moisture is removed again due to the adiabatic expansion, the air passes through the lower communication hole 13 of the wall-shaped pipe 10 and is then introduced into the lower flow line 14d of the reheater 4. The condensation chamber 18 is formed in the flow line 14d of the reheater 4, and the condensation mesh sieve 9 is installed in the condensation chamber 18. The condensation mesh sieve 9 has a dense net or a mesh-like sieve, and it has a structure suitable for condensing and extracting moisture in the cold and dry air. That is to say, after most moisture is removed from the air in the adiabatic expansion chamber 8, the remaining moisture forms on the condensation mesh sieve when the air comes in contact with the condensation mesh sieve, and then condensed and separated.

The moisture separated by the adiabatic expansion chamber 8 and the condensation mesh sieve 9 of the condensation chamber 18 as mentioned above is discharged out through the drainage hole 17.

After passing through the condensation mesh sieve 9, the air flows up along the internal channels of the reheater 4 and is then discharged through the upper channel 14e and the discharge hole 3. At this time, the air flowing along the internal channel of the reheater 4 is introduced through the introduction hole 2 and the flow line 14a, and it conducts third heat exchange with hot and humid compressed air flowing along other channels.

The plate heat exchanger of the present invention with configuration and function as mentioned above may be manufactured in a simple way by laminating and brazing the plates 1a and 1b. The manufacturing method includes the steps of: making a plate 1a by perforating a hole for forming a condensation chamber 18 and holes for forming flow lines 14a, 14b and 14e in a plate of a certain shape and making a plate 1b by perforating a hole for forming an adiabatic expansion chamber 8, a hole for forming a flow line 14c and holes for forming a working fluid inlet channel 15 and a working fluid outlet channel 16 in a plate of a certain shape; configuring a reheater 4 with the condensation chamber 18 and the flow lines 14a, 14b and 14e by laminating and brazing a plurality of the plates 1a and configuring a chiller 7 with the adiabatic expansion chamber 8, the flow line 14c and the working fluid inlet and outlet channels 15 and 16 by laminating and brazing a plurality of the plates 1b; attaching a wall-shaped pipe 10 between the reheater 4 and the chiller 7 so that a reheater-faced hole 11 is communicated with the flow line 14b of the reheater 4, a chiller-faced hole 12 is communicated with the flow line 14c of the chiller 7, and a communication hole 13 is communicated with the adiabatic expansion chamber 8 of the chiller 7 and the condensation chamber 18 of the reheater 4; inserting a condensation mesh sieve 9 into the condensation chamber 18; and finishing an outermost part of the reheater 4 and the chiller 7.

As described above, the manufacturing method of the present invention ensures the condensation chamber 18 or the adiabatic expansion chamber 8 is integrally formed in an easy way just by laminating and brazing the plates 1a and 1b in which holes for forming flow lines or the like are perforated. That is to say, the adiabatic expansion chamber 8 and the condensation mesh sieve 9 are formed in the plate heat exchanger 100 to play a role of separating moisture like a separator, and the adiabatic expansion chamber 8 and the condensation chamber 18 in which the condensation mesh sieve 9 is installed are naturally formed when the plates 1a and 1b are laminated to form the reheater 4 and the chiller 7. As mentioned above, the heat exchanger 100 for achievement of the object of the present invention may be easily manufactured in a way that holes for forming the condensation chamber 18 and holes for forming the flow lines 14a, 14b and 14e are formed in the plates 1a that configure the reheater 4, and holes for forming the adiabatic expansion chamber 8, holes for forming the flow line 14c, and holes for forming the working fluid inlet and outlet channels 15 and 16 are formed in the plates 1b that configure the chiller 7.

In the present invention, the adiabatic expansion chamber 8 is formed in a lower portion of the chiller 7 and the condensation mesh sieve 9 is installed in a lower portion of the reheater 4 in order to remove moisture from the hot and humid compressed air. Thus, a conventional separator installed outside may be excluded, so heat transfer loss caused by channels such as pipes for connecting the separator to a reheater 4 and a chiller 7 may be minimized and discharging efficiency of condensed fluid may be maximized. In addition, a cooling air drier may become smaller and lighter. Moreover, since several parts such as the separator and the pipe are not used, the present invention ensures higher productivity and reduced cost.

What is claimed is:

1. An integrated plate heat exchanger, comprising:
   a reheater including laminated plates configured such that spaces are present between the laminated plates in a width direction of said heat exhanger which collectively define a first set of reheater channels and a second set of reheater channels, each for passage of compressed air, the reheater further including a compressed air inlet in communication with the first set of reheater channels and a compressed air outlet in communication with the second set of reheater channels;
   a chiller including other laminated plates configured such that other spaces are present between the other laminated plates in said width direction which collectively define a first set of chiller channels and a second set of chiller channels, said first set of chiller channels being for passage of a working fluid and said second set of chiller channels being for passage of the compressed air transferred thereto from the reheater, the chiller further including a working fluid inlet and a working fluid outlet connected to said first set of chiller channels;
   a pipe being disposed between said reheater and said chiller, said pipe including a first wall facing said reheater and a second wall facing said chiller, said first and second walls being spaced apart from one another to define a gap therebetween,
   said first and second walls extending at least from one terminal end to another terminal end of the reheater or chiller in a height direction of said heat exchanger, which runs crosswise to said width direction, and forming a partition between said laminated plates and said other laminated plates of said reheater and said chiller, respectively, said gap in said pipe providing a flow line through which the compressed air is upwardly passable from the reheater to the chiller, said first set of reheater channels being in communication with said pipe in a lower position thereof and said second set of chiller channels being in communication with said pipe in an upper position thereof such that the compressed air received through said compressed air inlet and passed through the first set of reheater channels is transferred to said second set of chiller channels via said flow line of said pipe;
   an adiabatic expansion chamber being disposed below the first and second sets of chiller channels, said adiabatic expansion chamber being in communication with said second set of chiller channels so as to receive the compressed air passed therethrough; and
   a condensation chamber in communication with the adiabatic expansion chamber, said condensation chamber being disposed below the first and second sets of reheater channels of the reheater, said condensation chamber further communicating with said second set of reheater channels, such that the compressed air from the second set of chiller channels is passed through the adiabatic expansion chamber and the condensation chamber, and then is passed through the second set of reheater channels to the compressed air outlet.

2. The integrated plate heat exchanger according to claim 1, wherein said pipe is substantially coextensive in at least said height direction with at least one of said laminated plates of said reheater or said other laminated plates of said chiller.

3. The integrated plate heat exchanger according to claim 1, wherein the laminated plates include generally aligned holes that collectively define the condensation chamber and generally aligned holes that collectively define flow lines.

4. The integrated plate heat exchanger according to claim 1, wherein the other laminated plates include generally aligned holes that collectively define the adiabatic expansion chamber, generally aligned holes that collectively define a flow line, and generally aligned holes that collectively define said working fluid inlet and said working fluid outlet.

5. The integrated plate heat exchanger according to claim 1, wherein:
the pipe includes a reheater-faced hole in said first wall into which the compressed air from the first set of reheater channels of the reheater is introduced, and a chiller-faced hole in said second wall through which the compressed air is supplied from the pipe to the chiller and
a portion of the pipe that is closer to a bottom than a top of the reheater has a discontinuity which forms a communication channel that connects the chiller with the reheater.

6. The integrated plate heat exchanger according to claim 1, wherein the adiabatic expansion chamber is formed in the chiller by uniting the second set of chiller channels of the chiller.

7. The integrated plate heat exchanger according to claim 1, wherein:
the compressed air inlet is positioned in a portion of the reheater closer to a top than a bottom of the reheater;
a first compressed air flow line which is in communication with the compressed air inlet is formed through the laminated plates so as to communicate with the first set of reheater channels; and
a second compressed air flow line is positioned in a portion of the reheater closer to the bottom than the top of the reheater so as to be connected to a reheater-faced hole in said first wall of the pipe, the second flow line being in communication with the first compressed air flow line.

8. The integrated plate heat exchanger according to claim 1, wherein:
another flow line is formed in a portion of the chiller closer to a top than a bottom of the chiller so as to be connected to a chiller-faced hole in the second wall of the pipe and is in communication with the second set of chiller channels, the second set of chiller channels being one or more interlayer channels between the other laminated plates;
the pipe includes a communication channel of the pipe running crosswise to said flow line in said pipe that is formed by a discontinuity in the pipe and which is isolated from said flow line, said communication channel connecting said adiabatic expansion chamber with said second set of reheater channels via said condensation chamber;
the adiabatic expansion chamber is formed in a portion of the chiller closer to the bottom than the top of the chiller and is connected to said communication channel of the pipe; and
a working fluid inlet channel is provided in communication with the working fluid inlet, and the working fluid inlet channel communicates with a working fluid outlet channel which communicates with the working fluid outlet via the first set of chiller channels.

9. The integrated plate heat exchanger according to claim 1, wherein:
the condensation chamber is united with the second set of reheater channels; and
the second set of reheater channels is in communication with the compressed air outlet of the reheater.

10. The integrated plate heat exchanger according to claim 1, wherein the laminated plates and the other laminated plates are corrugated.

11. The integrated plate heat exchanger according to claim 1, wherein a condensation mesh sieve and a drainage hole are provided in said condensation chamber.

12. The integrated plate heat exchanger according to claim 1, wherein:
the adiabatic expansion chamber is formed only in the chiller; and
the condensation chamber is formed only in the reheater.

13. The integrated plate heat exchanger according to claim 5, wherein the communication channel connects the adiabatic expansion chamber to the condensation chamber.

* * * * *